United States Patent
Zhang et al.

(10) Patent No.: US 12,052,072 B2
(45) Date of Patent: Jul. 30, 2024

(54) METHOD AND NETWORK ELEMENT FOR USER EQUIPMENT SCHEDULING

(71) Applicant: Telefonaktiebolaget LM Ericsson (publ), Stockholm (SE)

(72) Inventors: Yipeng Zhang, Beijing (CN); Huaisong Zhu, Beijing (CN); Yanyan Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 380 days.

(21) Appl. No.: 17/624,752

(22) PCT Filed: Jul. 5, 2019

(86) PCT No.: PCT/CN2019/094879
§ 371 (c)(1),
(2) Date: Jan. 4, 2022

(87) PCT Pub. No.: WO2021/003603
PCT Pub. Date: Jan. 14, 2021

(65) Prior Publication Data
US 2022/0263545 A1 Aug. 18, 2022

(51) Int. Cl.
*H04B 7/0452* (2017.01)
*H04L 5/00* (2006.01)

(52) U.S. Cl.
CPC ......... *H04B 7/0452* (2013.01); *H04L 5/0051* (2013.01)

(58) Field of Classification Search
CPC . H04B 7/0452; H04L 5/0051; H04L 25/0222; H04L 25/0246; H04L 25/03891; H04L 1/1887
See application file for complete search history.

(56) References Cited

U.S. PATENT DOCUMENTS

| | | | |
|---|---|---|---|
| 2010/0103892 A1* | 4/2010 | Abrahamsson | H04W 72/542 370/329 |
| 2018/0042028 A1* | 2/2018 | Nam | H04L 5/0035 |
| 2018/0352523 A1 | 2/2018 | Yang et al. | |

FOREIGN PATENT DOCUMENTS

| CN | 101834707 A | 9/2010 |
|---|---|---|
| CN | 102468913 A | 5/2012 |
| CN | 104348590 A | 2/2015 |

(Continued)

OTHER PUBLICATIONS

China Telecom, "An adaptive dual-codebook feedback scheme in LTE-A systems", 3GPP TSG-RAN WG1 #xx, Apr. 12-16, 2010, pp. 1-7, Beijing, China, R1-102152.

(Continued)

*Primary Examiner* — Hashim S Bhatti
(74) *Attorney, Agent, or Firm* — Sage Patent Group (57) ABSTRACT

The present disclosure proposes a method, a network element, and a non-transitory computer readable storage medium for scheduling a user equipment (UE) for transmission. The method comprises: determining, for the UE, a first downlink channel status at a first time point and a second downlink channel status at a second time point which is later than the first time point, respectively, determining, for the UE, a temporal coherence between the first downlink channel status and the second downlink channel status; and scheduling the UE based on the determined temporal coherence.

19 Claims, 6 Drawing Sheets

(56) References Cited

FOREIGN PATENT DOCUMENTS

EP 3297376 A1 3/2018
GB 2453979 A 4/2009

OTHER PUBLICATIONS

Meyr, H. et al., "Part E Communication over Fading Channels", Digital Communication Receivers: Synchronization, Channel Estimation, and Signal Processing, Jan. 1, 1998, pp. 581-629, a Wiley-Intersceince Publication.

* cited by examiner

METHOD AND NETWORK ELEMENT FOR USER EQUIPMENT SCHEDULING

TECHNICAL FIELD

The present disclosure generally relates to the field of communication technology, and in particular, to a method and a network element for scheduling a user equipment (UE) for transmission.

BACKGROUND

This section introduces aspects that may facilitate better understanding of the disclosure. Accordingly, the statements of this section are to be read in this light and are not to be understood as admissions about what is in the prior art and/or what is not in the prior art.

With fast growth of global telecommunication markets and increasing demands for speed and throughput of telecommunication equipment, telecommunication operators are required to provide network access with even higher speed and throughput. One way to provide such network access is to use the Massive MIMO technology.

The Massive MIMO technology makes a clean break with current practice through the use of a very large number of service antennas that are operated fully coherently and adaptively. Extra antennas help by focusing the transmission and reception of signal energy into ever-smaller regions of space. This brings huge improvements in throughput and energy efficiency, in particularly when combined with simultaneous scheduling of a large number of user terminals (e.g., tens or hundreds). Other benefits of massive MIMO include support for MU-MIMO.

MU-MIMO is a set of multiple-input and multiple-output (MIMO) technologies for wireless communication, in which a set of users or wireless terminals, each with one or more antennas, communicate with each other. In contrast, single-user MIMO (SU-MIMO) only considers a single multi-antenna transmitter communicating with a single multi-antenna receiver. In a similar way that Orthogonal Frequency Division Multiple Access (OFDMA) adds multiple access (multi-user) capabilities to Orthogonal Frequency Division Multiplexing (OFDM), MU-MIMO adds multiple access (multi-user) capabilities to MIMO. In other words, with MU-MIMO enabled, multiple UEs at different positions can simultaneously access a network with exactly same frequency/time resources. The Massive MIMO can provide asymptotically orthogonal channels to the UEs, and experiments have so far not disclosed any limitations in this regard.

While massive MIMO renders many traditional research problems irrelevant, it uncovers entirely new problems that urgently need attention, for example, the need for accurate channel status estimation and flexible UE scheduling.

SUMMARY

According to some embodiments of the present disclosure, a method, a network element, and a non-transitory computer readable storage medium are provided.

According to a first aspect of the present disclosure, a method at a network element for scheduling a user equipment (UE) for transmission is provided. The method comprises: determining, for the UE, a first downlink channel status at a first time point and a second downlink channel status at a second time point which is later than the first time point, respectively; determining, for the UE, a temporal coherence between the first downlink channel status and the second downlink channel status; and scheduling the UE based on the determined temporal coherence.

In some embodiments, the step of determining, for the UE, a first channel status at a first time point and a second channel status at a second time point which is later than the first time point, respectively, comprises: determining, for the UE, a first uplink channel status at the first time point based on one or more uplink reference signals, as the first downlink channel status; and determining, for the UE, a second uplink channel status at the second time point based on one or more uplink reference signals, as the second downlink channel status.

In some embodiments, the UE has a single antenna for downlink transmission, and wherein the step of determining, for the UE, a temporal coherence between the first downlink channel status and the second downlink channel status comprises: calculating the temporal coherence based on the equation as follows: Coherence=abs $(H(t_1)*H^*(t_2))$, where Coherence denotes the temporal coherence to be calculated, $H(t_1)$ denotes the downlink channel status vector for the UE at the first time point $t_1$, $H^*(t_2)$ denotes the conjugate transpose of the downlink channel status vector for the UE at the second time point $t_2$, and abs(x) denotes the absolute value of x.

In some embodiments, the UE has multiple antennas for downlink transmission, and wherein the step of determining, for the UE, a temporal coherence between the first downlink channel status and the second downlink channel status comprises: calculating the temporal coherence based on the equation as follows: Coherence=$L_2(H(t_1)*H^*(t_2))$, where Coherence denotes the temporal coherence to be calculated, $H(t_1)$ denotes the downlink channel status matrix for the UE at the first time point $t_1$, $H^*(t_2)$ denotes the conjugate transpose of the downlink channel status matrix for the UE at the second time point $t_2$, and $L_2(x)$ denotes the L2 norm of x.

In some embodiments, the step of scheduling the UE based on the determined temporal coherence comprises: precluding the UE from Multi-User Multi-Input-Multi-Output (MU-MIMO) transmission when it is determined that the temporal coherence is less than or equal to a first predetermined threshold.

In some embodiments, the step of precluding the UE from MU-MIMO transmission when it is determined that the temporal coherence is less than or equal to a first predetermined threshold comprises: releasing resource previously assigned to the UE for MU-MIMO transmission; and excluding the UE from the list of MU-MIMO candidates.

In some embodiments, the method further comprises: improving channel status for the UE when it is determined that the temporal coherence is greater than a first predetermined threshold and less than or equal to a second predetermined threshold.

In some embodiments, the step of improving channel status for the UE comprises at least one of: assigning dedicated reference signal (RS) resource to the UE for MU-MIMO transmission; and limiting a number of UEs in a list of MU-MIMO candidates comprising the UE; limiting a number of streams in any downlink MU-MIMO transmission from the network element; and prioritizing the UE over other UEs in a list of MU-MIMO candidates comprising the UE.

In some embodiments, the step of assigning dedicated RS resource to the UE for MU-MIMO transmission comprises: assigning, to the UE, a DeModulation Reference Signal (DMRS) port, which is currently not shared by other UEs in the list of MU-MIMO candidates.

In some embodiments, the method further comprises: deprioritizing the UE with respect to other UEs in the list of MU-MIMO candidates comprising the UE when it is determined that the temporal coherence is greater than a first predetermined threshold and less than or equal to a second predetermined threshold.

In some embodiments, the second time point is later than the first time point by a time length within a range between 2 ms and 640 ms.

In some embodiments, $H(t_1)$ and $H^*(t_2)$ are normalized.

In some embodiments, the first predetermined threshold has a value within a range between 0.4 and 0.6.

In some embodiments, the second predetermined threshold has a value within a range between 0.8 and 0.95.

According to another aspect of the present disclosure, a network element is provided. The network element comprises: a processor; a memory storing instructions which, when executed by the processor, cause the processor to perform the steps of the method according to the first aspect.

According to yet another aspect of the present disclosure, a non-transitory computer readable storage medium is provided. The non-transitory computer readable storage medium stores instructions which, when executed by one or more processors, cause the one or more processors to perform the steps of the method according to the first aspect.

Additional aspects of the present disclosure will be set forth, in part, in the detailed description, figures, and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of Long Term Evolution (LTE), the present disclosure is not limited thereto. In fact, as long as MU- MIMO is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 5th Generation New Radio (5G NR), etc. Therefore, one skilled in the arts could readily understand that the terms used herein may also refer to their equivalents in any other infrastructure. For example, the term "User Equipment" or "UE" used herein may refer to a mobile device, a mobile terminal, a mobile station, a user device, a user terminal, a wireless device, a wireless terminal, or any other equivalents. For another example, the term "eNodeB" or "eNB" used herein may refer to a base station, a base transceiver station, an access point, a hot spot, a NodeB, an Evolved NodeB, a gNB, a network element, or any other equivalents.

Further, please note that the terms "stream" and "layer" are synonyms and can be used interchangeably herein.

Figure 1:
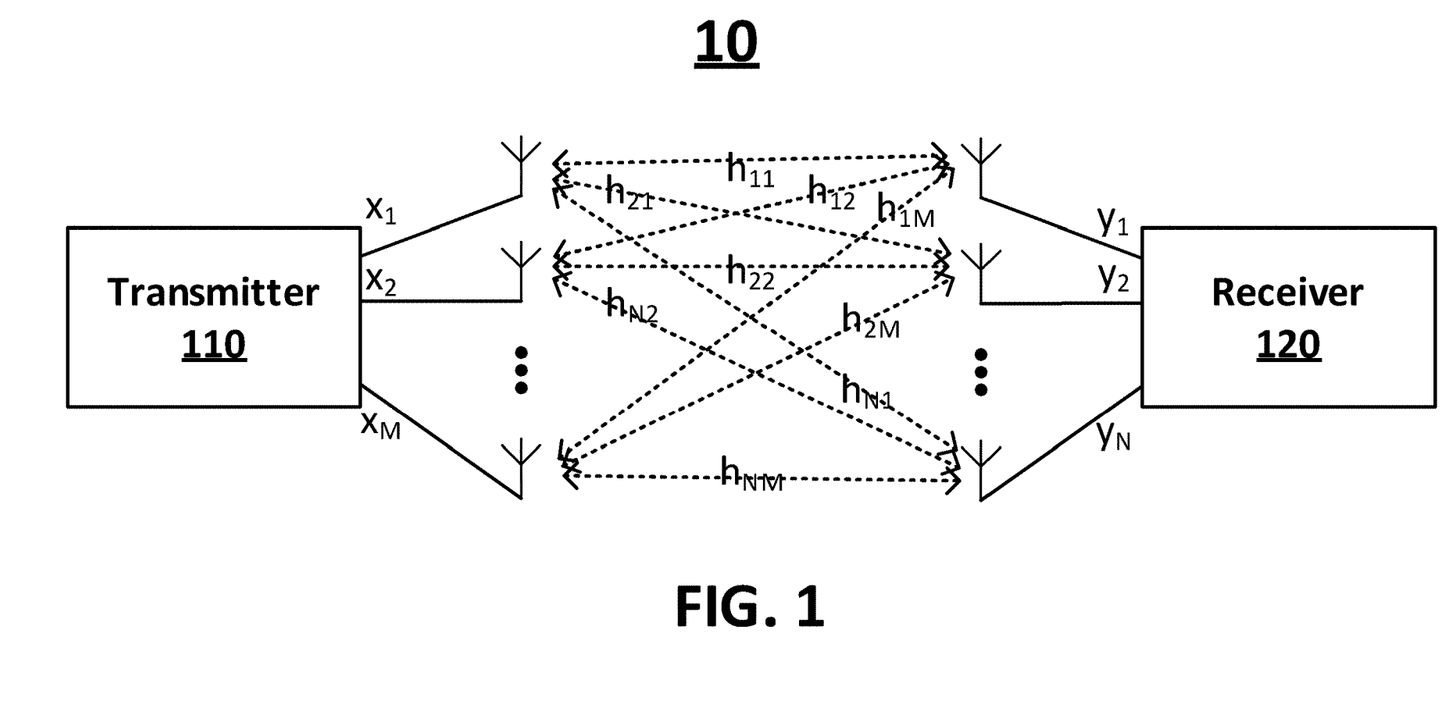
FIG. 1 is a diagram illustrating an exemplary Single-User Multi-Input-Multi-Output (SU-MIMO) system according to an embodiment of the present disclosure.

FIG. 1 is a diagram illustrating an exemplary Single-User Multi-Input-Multi-Output (SU-MIMO) system 10 according to an embodiment of the present disclosure. As shown in FIG. 1, the SU-MIMO system 10 may comprise a transmitter 110 and a receiver 120. In a typical 4G LTE scenario, the transmitter 110 may be an eNodeB and the receiver 120 may be a User Equipment (UE) or vice versa, and in a typical 5G NR scenario, the transmitter 110 may be a gNB and the receiver 120 may be a UE or vice versa. Further, in a typical Wi-Fi scenario, the transmitter 110 may be a Wi-Fi access point (AP) and the receiver 120 may be a wireless device or vice versa. However, these are only specific examples of the entities in the SU-MIMO system 10, and the present disclosure is not limited thereto.

As also shown in FIG. 1, the transmitter 110 may have M antennas for transmission and the receiver 120 may have N antennas for reception, where M and N are integers greater than or equal to 1. In an exemplary and typical MIMO configuration, M is much greater than N, but the present disclosure is not limited thereto. As shown in FIG. 1, multiple data streams can be spatially multiplexed over the M transmit antennas and received by the N receiver antennas. Spatially multiplexing increases the capacity of the links, since multiple data streams are transmitted over the same available frequency band.

Hence, a channel model is needed to properly assess a MIMO channel. Here, as can be seen from FIG. 1, each receiver antenna receives not only the direct signal intended for it, but also receives a fraction of signal from other propagation paths. Thus, the channel response may be expressed as a channel transmission matrix or channel matrix H. The direct path formed between antenna 1 at the transmitter 110 and the antenna 1 at the receiver 120 may be represented by the channel response $h_{11}$. The channel response of the path formed between antenna 1 at the transmitter 110 and the antenna 2 at the receiver 120 may be expressed as $h_{21}$, and so on. Thus, the channel matrix H is of dimension N×M.

The vector y received by the receiver 120 may be expressed in terms of the channel transmission matrix or channel matrix H, the input vector x, and the noise vector n according to the equation (1) below:

$$y = Hx + n \quad (1)$$

where the various symbols may be defined as follows:

$$y = \begin{bmatrix} y_1 \\ y_2 \\ \vdots \\ y_N \end{bmatrix}$$

$$x = \begin{bmatrix} x_1 \\ x_2 \\ \vdots \\ x_M \end{bmatrix}$$

$$H = \begin{bmatrix} H_1 \\ H_2 \\ \vdots \\ H_N \end{bmatrix} = \begin{bmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{bmatrix}$$

$$n = \begin{bmatrix} n_1 \\ n_2 \\ \vdots \\ n_M \end{bmatrix}$$

Please note that the responses of the MIMO links are expressed as a set of linear equations. For example, for a simple 2×2 MIMO configuration, the received signal vector y may be expressed as:

$$y_1 = h_{11}x_1 + h_{12}x_2 + n_1$$
$$y_2 = h_{21}x_1 + h_{22}x_2 + n_2$$

or $$\begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix}$$

The receiver 120 may solve this set of equations to find out what was transmitted (x) by the transmitter 110. A typical method for solving the equation (1) is called the SVD (Singular Value Decomposition) method as shown by the equation (2) below:

$$H = U \sum V^* \quad (2)$$

where U and V are unitary matrices of N×N and M×M (V* is conjugate transpose of V), respectively, and Σ is a diagonal matrix of N×M. Therefore, the equation (1) may be transformed into the equation (3) as follows:

$$y = \left(U \sum V^*\right)x + n \quad (3)$$

where $$\sum = \begin{pmatrix} \lambda_1 & 0 & \cdots & 0 \\ 0 & \ddots & 0 & \vdots \\ 0 & 0 & \lambda_N & 0 \end{pmatrix}$$

or

-continued $$\sum = \begin{pmatrix} \lambda_1 & 0 & 0 \\ 0 & \ddots & 0 \\ \vdots & 0 & \lambda_M \\ 0 & \cdots & 0 \end{pmatrix}$$

depending on whether M is greater than N or not.

Further, by applying V at the transmitter 110 as the precoding matrix before transmission and applying U* at the receiver 120 as the receiver matrix after the reception and assuming M is greater than or equal to N, the equation (3) may be further transformed into the equation (4) as follows:

$$y' = \sum x' + n' \quad (4)$$

or $$\begin{cases} y'_1 = \lambda_1 x'_1 + n'_1 \\ y'_2 = \lambda_2 x'_2 + n'_2 \\ \vdots \\ y'_N = \lambda_N x'_N + n'_N \end{cases}$$

where y'=U*y, and x'=V*x, and n'=U*n.

This is because:

$$y' = U^* y = U^* \left( U \sum V^* \right) x + U^* n =$$

$$(U^* U) \sum (V^* x) + n' = \sum x' + n' = \begin{pmatrix} \lambda_1 & 0 & \cdots & 0 \\ 0 & \ddots & 0 & \vdots \\ 0 & 0 & \lambda_N & 0 \end{pmatrix} * \begin{pmatrix} x'_1 \\ x'_2 \\ \vdots \\ x'_M \end{pmatrix} + \begin{pmatrix} n'_1 \\ n'_2 \\ \vdots \\ n'_M \end{pmatrix}$$

In other words, by applying the precoding matrix V and the receiver matrix U*, the set of equations which are to be solved by the receiver 120 may be simplified into N independent linear equations in the system of equations (4) and the transmitted signal vector x or x' may be solved easily. Based on the equation (4), the channel status may be simplified as if the signal $x'_1$ is directly transmitted from antenna 1 at the transmitter 210 to the antenna 1 at the receiver 220, and the signal $x'_M$ is directly transmitted from antenna M at the transmitter 210 to the antenna M at the receiver 220 without interfering with each other. In such a case, the signal $x'_i$ (i=1, . . . , M) can be regarded as the original signal to be transmitted from the transmitter 210 to the receiver 220.

Figure 2A:
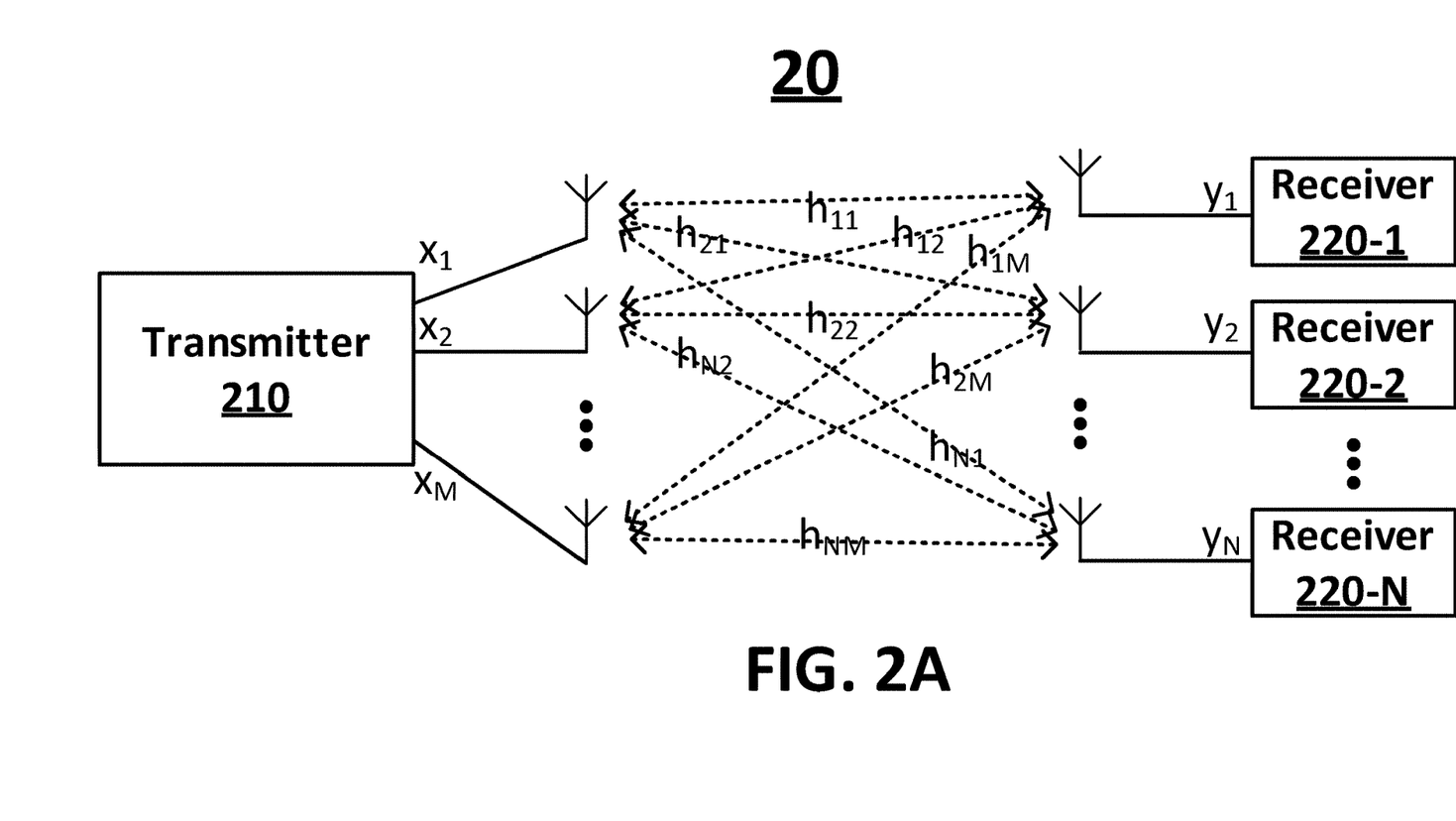
FIG. 2A and FIG. 2B are diagrams illustrating exemplary Multi-User Multi-Input-Multi-Output (MU-MIMO) systems according to some embodiments of the present disclosure, respectively.
Figure 2B:
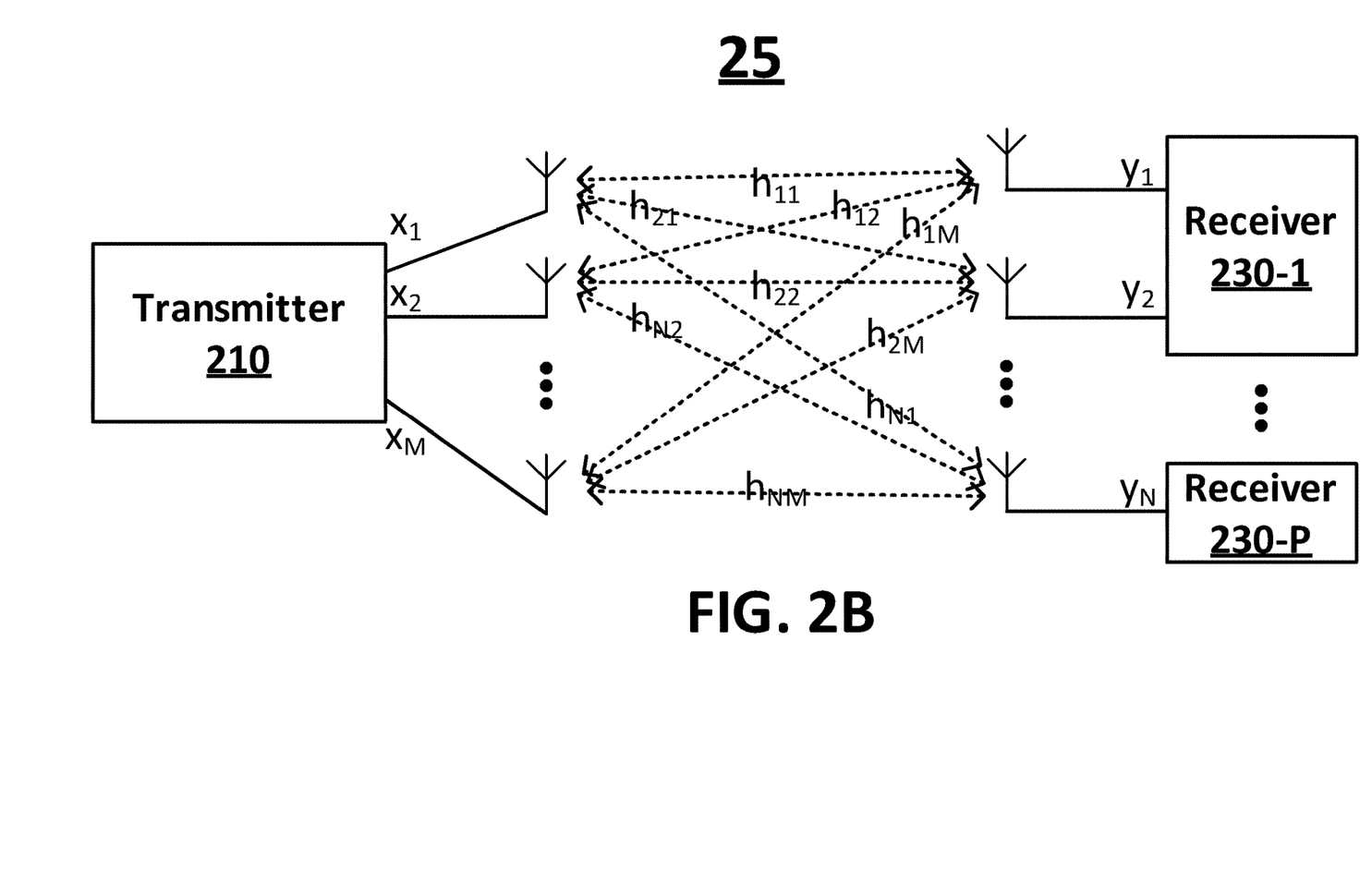

FIG. 2A and FIG. 2B are diagrams illustrating exemplary Multi-User Multi-Input-Multi-Output (MU-MIMO) systems 20 and 25 according to some embodiments of the present disclosure, respectively.

As shown in FIG. 2A, the MU-MIMO system 20 may comprise a transmitter 210 and N receivers 220-1, 220-2, . . . , 220-N (hereinafter, the receivers may be collectively referred to as the receivers 220). Similar to that shown in FIG. 1, the transmitter 210 may have M antennas for transmission. However, each of the receivers 220 may have one antenna for reception, and therefore there are totally N receiver antennas. However, the present disclosure is not limited thereto. For example, a receiver (e.g. the receiver 230-1 shown in FIG. 2B) may have two or more antennas.

The channel models shown in FIG. 2A and FIG. 2B are similar to that described with reference to FIG. 1, and therefore the description thereof is omitted for simplicity.

However, one of most critical blocking issues for MU-MIMO deployment is that: MU-MIMO is very sensitive to channel status error. Errors can be introduced by many factors, for example:

Error caused by channel aging or UE mobility. Even if a gNB/eNB periodically detects its channels, the gNB/eNB still cannot estimate the channels without error because the UE may be moving or the channel environment may be varying. Some study shows that channels exhibit large capacity fluctuations on the order of milliseconds, even with just a pedestrian level of mobility. It should be noted that both for 4G LTE and 5G NR, it is almost impossible to update each UE's channel estimation at an interval of several milliseconds, especially when the eNB/gNB's load is high.

Error caused by inaccurate channel estimation. To support MU-MIMO, a gNB/eNB should obtain channel status related information, which can be based on, for example, uplink measurement, according to the principle of reciprocity. For any channel measurement, due to impairment of receiver and noise/interference impact, it is also inevitable to introduce error to some extent.

To facilitate the reader in understanding of the issue, an example of channel status error will be given below. Without loss of generality, assuming that 3 UEs (e.g. the receivers 220-1, 220-2, and 220-3 in FIG. 2A) are served by a gNB/eNB (e.g. the transmitter 210 in FIG. 2A) in the MU-MIMO mode, for example. According to the above definition with regard to the equations (1)-(4), the signals transmitted by the gNB/eNB 210 on a specific subcarrier may be expressed as:

$$x = W_1 * S_1 + W_2 * S_2 + W_3 * S_3$$

where x is the signal vector transmitted from the gNB/eNB 210, $S_i$ is the signal destined to UE #i, and $W_i$ is the precoder for UE #i where i=1, 2, 3. In other words, $S_1$, $S_2$, and $S_3$ correspond to $x'_1$, $x'_2$, and $x'_3$ as mentioned with reference to the above equation (4), respectively, and $W_1$, $W_2$ and $W_3$ correspond to the row vectors of the precoding matrix V as mentioned in the equations (2) and (3), respectively.

According to the above equation (1) and assuming there is no noise, the signal $y_1$ received by UE #1 220-1 from the gNB/eNB 210 may be expressed as:

$$y_1 = H_1 x = H_1 * W_1 * S_1 + H_1 * W_2 * S_2 + H_1 * W_3 * S_3 \quad (5)$$

Here, $H_1$ denotes the channel state vector from the gNB/eNB 210 to UE #1 220-1 as also mentioned above with reference to the equation (1).

In such a case, according to the equation (4), the gNB/eNB 210 should guarantee:

$$\|H_1 * W_1\| \gg 0$$

while $$\|H_1 * W_2\| \approx 0$$

and $$\|H_1 * W_3\| \approx 0.$$

In other words, UE #1 220-1 may receive its own signal and will not receive signals destined to other UEs (e.g. UE #2 220-2 and UE #3 220-3), which means that other UEs' signals will not interfere UE #1 210-1's performance. Therefore, the equation (5) may be transformed to:

$$y_1 = H_1 x = H_1 * W_1 * S_1 + H_1 * W_2 * S_2 + H_1 * W_3 * S_3 \approx H_1 * W_1 * S_1$$

The same applies to UE #2 220-2 and UE #3 220-3:

$$\|H_2 * W_2\| \gg 0$$

while $\|H_2 * W_1\| \approx 0$ and $\|H_2 * W_3\| \approx 0$.

$$\|H_3 * W_3\| \gg 0$$

while $\|H_3 * W_1\| \approx 0$ and $\|H_3 * W_2\| \approx 0$.

However, if the gNB/eNB 210 has some error in estimating $H_1$, i.e. the real channel status of UE #1 220-1 is $H_1 + \Delta H$ instead of $H_1$ assumed, while the gNB/eNB 210 still can get relatively good channel estimation for $H_2$ and $H_3$, then the UE #1 220-1 will suffer from great interference from UE #2 220-2 and UE #3 220-3 because:

$$y_1 = (H_1 + \Delta H)x =$$
$$H_1 * W_1 * S_1 + H_1 * W_2 * S_2 + H_1 * W_3 * S_3 + \Delta H * W_1 * S_1 + \Delta H * W_2 * S_2 +$$
$$\Delta H * W_3 * S_3 \approx (H_1 + \Delta H) * W_1 * S_1 + \Delta H * W_2 * S_2 + \Delta H * W_3 * S_3$$

Therefore, UE #1 220-1 will suffer from interferences from UE #2 220-2 and UE #3 220-3. The interference power expectation from the downlink signal for UE #2 220-2 is $\|\Delta H * W_2\|^2$, and the interference power expectation from the downlink signal for UE #3 220-3 is $\|\Delta H * W_3\|^2$.

Meanwhile, for UE #2 220-2, since the gNB/eNB 210 may acquire an error free estimation of its channel $H_2$, $$y_2 = H_2 x = H_2 * W_1 * S_1 + H_2 * W_2 * S_2 + H_2 * W_3 * S_3 \approx H_2 * W_2 * S_2$$

Therefore, UE #2 220-2 can still avoid interference from the downlink signals for UE #1 220-1 and UE #3 220-3. In other words, the channel status error for UE #1 220-1 at the gNB/eNB 210 will mostly impact the downlink performance for UE #1 220-1, but not for UE #2 220-2 or UE #3 220-3 if their channel estimations are accurate. Therefore, an accurate channel matrix H is required to ensure the MIMO transmission quality. However, some legacy designs may only consider UEs' speed or mobility. For example, if a UE's speed is higher than a certain threshold, this UE will not be operated in the MU-MIMO mode. Also, this kind of mobility related processing is just considering a subset of channel status error, rather than a full-picture solution. For example, the channel status error caused by inaccurate uplink measurement is typically not accounted for.

Further, all legacy solutions are typically built on the assumption that error is bimodal. That is, if an error level is high, the UE cannot be operated in the MU-MIMO mode, and if the error level is low, the UE may be operated in the MU-MIMO mode and the error impact will not be considered anymore. Obviously, this kind of bimodal processing is a quite coarse processing method.

In view of the above problem, some embodiments of the present disclosure present an inventive concept which introduces an indicator of channel status error level: "time domain coherence" or "temporal coherence". With the help of this error level indicator, the MU-MIMO system may select different processing methods flexibly and finely.

In principle, a gNB/eNB does not know what the error is and where the error is from in real time because only its UE(s) knows real channel status in the downlink direction, and the current 3GPP standard does not support the UE(s) to report too many details about its received signals and measurement results. However, the gNB/eNB still can use historical information to estimate the level of error $\Delta H$ (how great/high it was). For example, $\|\Delta H\|^2$ can be estimated from the statistic point of view.

To estimate the error level, a time domain coherence or temporal coherence may be calculated as follows:

$$\text{Coherence} = \text{abs}(H(t_1) * H^*(t_2)) \quad (6)$$

where Coherence denotes the temporal coherence to be calculated, $H(t_1)$ denotes the downlink channel status vector for the UE at the first time point $t_1$, $H^*(t_2)$ denotes the conjugate transpose of the downlink channel status vector for the UE at the second time point $t_2$, $t_2$ is later than $t_1$, and abs(x) denotes the absolute value of x.

Please note that the above definition of the temporal coherence may be applied when H is a channel status vector since each receiver may have only one antenna (e.g. the receiver 220-1 in FIG. 2A). However, for a receiver with two or more antennas (e.g. the receiver 230-1 in FIG. 2B) or a channel status matrix, a different definition or a more generalized definition of temporal coherence may be given as:

$$\text{Coherence} = L_2(H(t_1) * H^*(t_2)) \quad (7)$$

where Coherence denotes the temporal coherence to be calculated, $H(t_1)$ denotes the downlink channel status matrix for the UE at the first time point $t_1$, $H^*(t_2)$ denotes the conjugate transpose of the downlink channel status matrix for the UE at the second time point $t_2$, and $L_2(x)$ denotes the L2 norm of x. Further, the norm used herein is not limited to the L2 norm, and any appropriate norm can be used. For example, in some other embodiments, L1 norm, L-infinity norm, or the like may be used.

As mentioned above, a main source of error is channel aging or uplink channel estimation. Regardless of the error source, in time domain, the error will make periodical channel estimation results not fully correlated to each other. One typical example is the error caused by UE mobility. For example, the gNB/eNB estimates the channel status by uplink measurement, then the channel status estimated in subframe n (or the time point $t_1$) and subframe n+N (or the time point $t_2$) will probably be different (here N may be a fixed value, for example, 20 ms). In some other embodiments, the time interval between the two time points may have a time length within a range between 2 ms and 640 ms.

In such a case, for a user $u_0$ (for example, the receiver 220-1 in FIG. 2A), the temporal coherence may be defined as follows:

$$\text{Coherence} = \text{abs}\left(\frac{H_{u_0}(n) \cdot H_{u_0}^*(n+N)}{|H_{u_0}(n)||H_{u_0}(n+N)|}\right)$$

Assuming $H_{u_0}(n+N) = H_{u_0}(n) + \Delta H$, and the channel vector/matrix is normalized or abs $(H_{u_0}(n) \cdot H_{u_0}^*(n)) = 1$ without loss of the generality, then:

$$\begin{aligned}
\text{Coherence}^2 &= \text{abs}\left(\frac{H_{u_0}(n) \cdot H_{u_0}^*(n+N) \cdot H_{u_0}(n) \cdot H_{u_0}^*(n+N)}{|H_{u_0}(n)|^2 |H_{u_0}(n+N)|^2}\right) \\
&= \text{abs}\left(\frac{(H_{u_0}(n)(H_{u_0}(n) + \Delta H)^*)^2}{|H_{u_0}(n)|^2 |H_{u_0}(n) + \Delta H|^2}\right) \\
&= \text{abs}\left(\frac{(H_{u_0}(n)H_{u_0}^*(n) + H_{u_0}(n)\Delta H^*))^2}{|H_{u_0}(n)|^2 |H_{u_0}(n) + \Delta H|^2}\right) \\
&= \text{abs}\left(\frac{(H_{u_0}(n)H_{u_0}^*(n) + H_{u_0}(n)\Delta H^*)^2}{|H_{u_0}(n)|^2 (H_{u_0}(n) + \Delta H)(H_{u_0}(n) + \Delta H)^*}\right) \\
&= \text{abs}\left(\frac{(H_{u_0}(n)H_{u_0}^*(n) + H_{u_0}(n)\Delta H^*))^2}{\begin{array}{c}|H_{u_0}(n)|^2(H_{u_0}(n)H_{u_0}^*(n) + \Delta H H_{u_0}^*(n) + \\ H_{u_0}(n)\Delta H^* + \Delta H\Delta H^*)\end{array}}\right)
\end{aligned}$$

If $\text{abs}(\Delta H) \ll 1$; and $\Delta H$ is independent with respect to $H_{u_0}(n)$, which means especially for Massive MIMO, $(H_{u_0}(n) \Delta H^*) \approx 0$, this is true from statistic point of view, i.e.:

$$\begin{aligned}
\text{Expectation}(\text{Coherence}^2) &\approx \text{abs}\left(\frac{(H_{u_0}(n)H_{u_0}^*(n))^2}{|H_{u_0}(n)|^2(H_{u_0}(n)H_{u_0}^*(n) + \Delta H\Delta H^*)}\right) \\
&= \text{abs}\left(\frac{|H_{u_0}(n)|^4}{|H_{u_0}(n)|^2(|H_{u_0}(n)|^2 + |\Delta H|^2)}\right) = \\
&\frac{|H_{u_0}(n)|^2}{|H_{u_0}(n)|^2 + |\Delta H|^2} \\
&= \frac{|H_{u_0}(n)|^2(|H_{u_0}(n)|^2 - |\Delta H|^2)}{(|H_{u_0}(n)|^2 + |\Delta H|^2)(|H_{u_0}(n)|^2 - |\Delta H|^2)} \\
&= \frac{|H_{u_0}(n)|^2(|H_{u_0}(n)|^2 - |\Delta H|^2)}{(|H_{u_0}(n)|^4 - |\Delta H|^4)} \approx \\
&\frac{|H_{u_0}(n)|^2(|H_{u_0}(n)|^2 - |\Delta H|^2)}{(|H_{u_0}(n)|^4)} \\
&= 1 - \frac{|\Delta H|^2}{|H_{u_0}(n)|^2} = 1 - |\Delta H|^2
\end{aligned}$$

hence expectation of coherence is inverse with $\|\Delta H\|^2$, only when $\|\Delta H\|^2 = 0$, coherence=1;

In short, we have $$\text{Expectation}(\text{Coherence}^2) \approx 1 - \|\Delta H\|^2$$

where Expectation(·) is the expectation value of the argument.

Similarly, for a user $u_1$ (for example, the receiver 230-1 in FIG. 2B), the temporal coherence may be defined as follows:

$$\text{Coherence} = L_2\left(\frac{H_{u_1}(n) \cdot H_{u_1}^*(n+N)}{|H_{u_1}(n)||H_{u_1}^*(n+N)|}\right)$$

Likewise, we also have:

$$\text{Expectation}(\text{Coherence}^2) \approx 1 - \|\Delta H\|^2$$

Based thereon, it can be determined that the time domain coherence value may characterize the error level at least from the statistic point of view.

Figure 3:
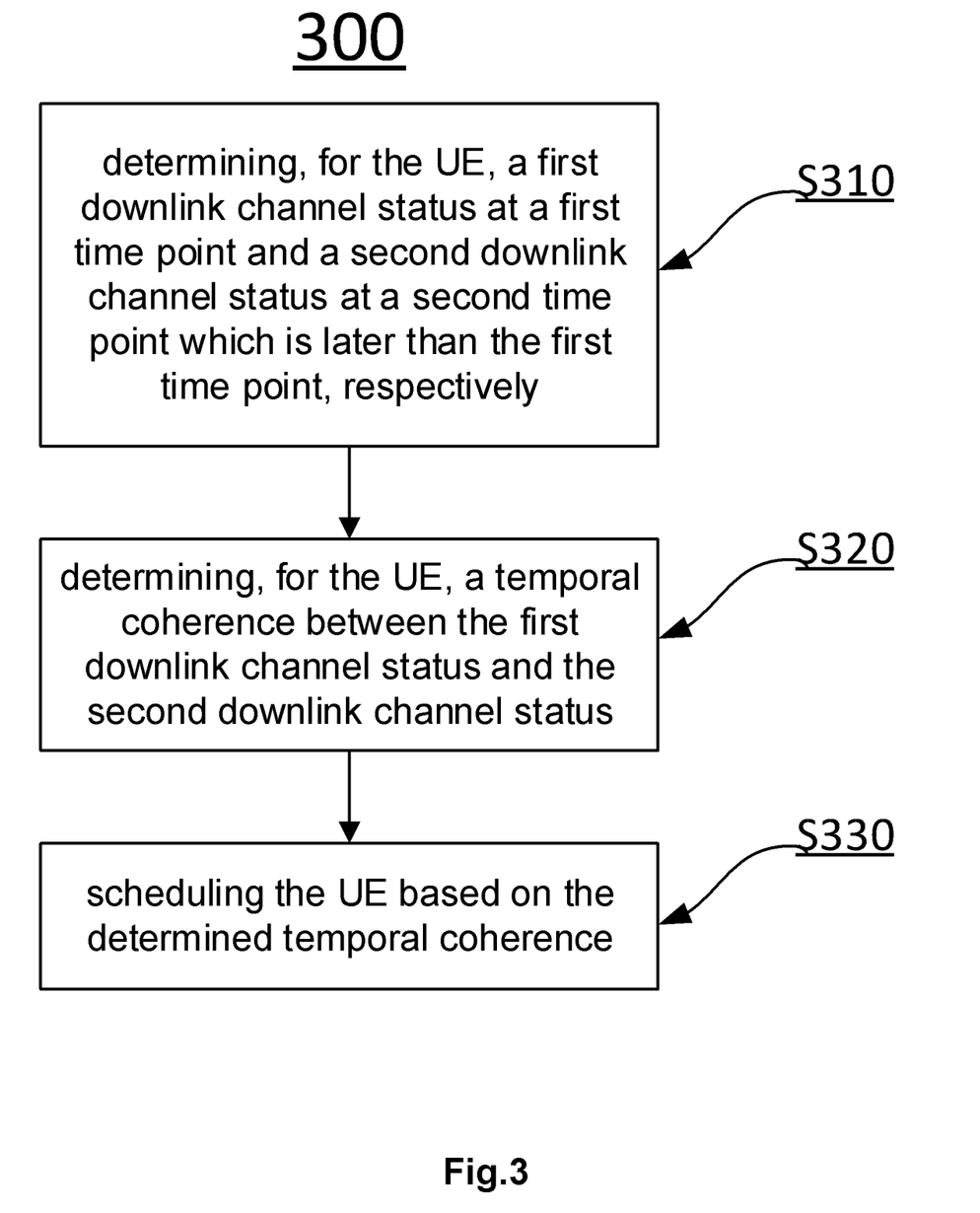
FIG. 3 is a flow chart of an exemplary method at a network element for scheduling a UE for transmission according to an embodiment of the present disclosure.

Next, a detailed description of a temporal coherence based method for scheduling UEs will be provided with reference to FIG. 3.

FIG. 3 is a flow chart of an exemplary method 300 at a network element for scheduling a UE for transmission according to an embodiment of the present disclosure. In the embodiment shown in FIG. 3, the network element may be an eNB in a 4G LTE scenario or a gNB in a 5G NR scenario. However, the present disclosure is not limited thereto. The network element can be a network device or a network node.

The method 300 may begin at step S310 where a first downlink channel status for the UE at a first time point (e.g. $t_1$) and a second downlink channel status for the UE at a second time point (e.g. $t_2$) may be determined. The determinations of the first and second downlink channel status may be concurrently performed or performed once related data for determination is ready. In an embodiment, the second time point $t_2$ may be the current time, and the first time point $t_1$ may be 20 ms earlier. Further, please note that the term "channel status" as used herein refers to a channel status matrix or a channel status vector.

As mentioned above, the channel matrix may be determined based the principle of reciprocity. In other words, the downlink channel status for the UE may be determined based on the uplink channel measurement. For example, based on one or more uplink reference signals, a first uplink channel status at the first time point $t_1$ may be determined as the first downlink channel status, and a second uplink channel status at the second time point $t_2$ may be determined as the second downlink channel status. In an embodiment, the uplink reference signals used for the determination may be Sounding Reference Signal (SRS) and/or DeModulation Reference Signal (DMRS) as defined by related 3GPP Technical Specifications. However, the present disclosure is not limited thereto.

In TDD (Time Division Duplex) mode, MIMO may take advantage of the reciprocity of the channel to reduce the overhead in channel estimation. It can estimate the downlink channel based on the uplink channel obtained from uplink RSs. For this to work, the Tx and Rx chains in the network element should be calibrated so that they are reciprocal. Since this is known in the art, and the description thereof is omitted for simplicity.

After the downlink channel status at different time points are determined, the method may proceed to the step S320 where a temporal coherence between the first downlink channel status and the second downlink channel status are determined, for example, by using the above equations (6) or (7).

Once the temporal coherence for the UE is determined, the method may proceed to the step S330 where the UE is scheduled at the network element based on the determined temporal coherence. Next, the detailed description of the step S330 will be given with reference to FIG. 4.

Figure 4:
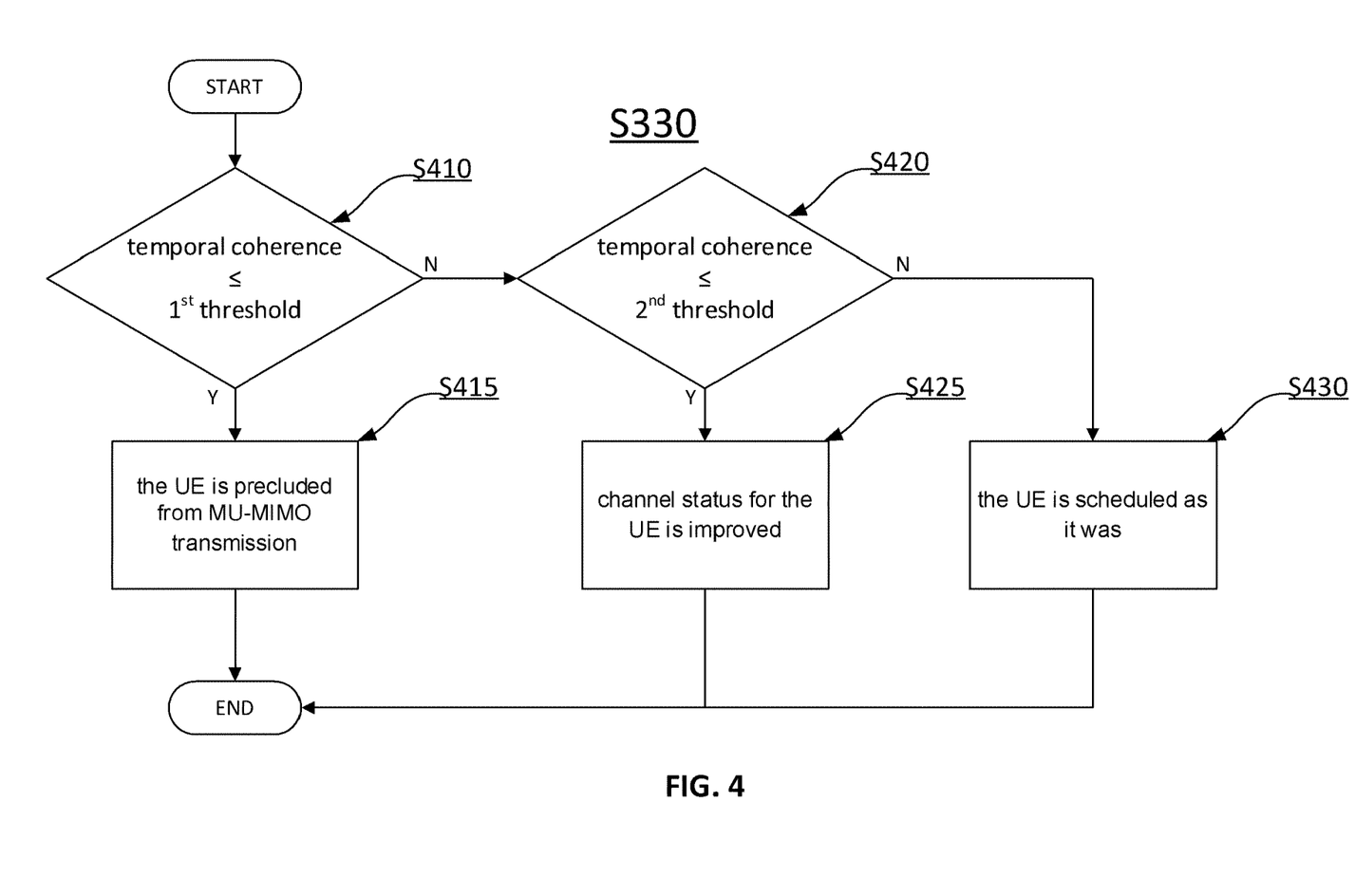
FIG. 4 is a flow chart of an exemplary implementation of a step of the method of FIG. 3 according to an embodiment of the present disclosure.

FIG. 4 is a flow chart of an exemplary implementation of the step S330 of the method 300 according to an embodiment of the present disclosure. Once the network element has the temporal coherence calculated, it may compare the temporal coherence with a first predetermined threshold (e.g. 0.6) at the step S410. In some other embodiments, the first predetermined threshold may have a value within a range between 0.4 and 0.6. When it is determined at the step S410 that the temporal coherence is less than or equal to the first predetermined threshold, which indicates that the temporal coherence is too low or the channel estimation error level is too high and this UE can barely benefit from MU-MIMO, the UE may be precluded from MU-MIMO transmission at step S415, and then the method 300 may end.

In some embodiments, the step S415 may comprise the sub-steps of: releasing resource previously assigned to the UE for MU-MIMO transmission; and excluding the UE from the list of MU-MIMO candidates. The resource assigned to the UE may comprise: time/frequency resource blocks for UE's transmission/reception, reference signal resources (e.g. DMRS/SRS/CSI-RS), and the like. Once the network element determines that it is no worth to keep the UE in the MU-MIMO state, it may release or de-assign all the resources for the UE and exclude the UE from participating in any future MU-MIMO transmissions.

When it is determined at the step S410 that the temporal coherence is greater than the first predetermined threshold, the network element may further compare the temporal coherence with a second predetermined threshold (e.g. 0.9) at the step S420. In some other embodiments, the second predetermined threshold may have a value within a range between 0.8 and 0.95. When it is determined at the step S420 that the temporal coherence is less than or equal to the second predetermined threshold, which indicates that the temporal coherence is not too low or the channel estimation error level is medium, the channel status for the UE may be improved at step S425, and then the method 300 may end.

In some embodiments, the step S425 may comprise at least one of: assigning dedicated reference signal (RS) resource to the UE for MU-MIMO transmission; and limiting a number of UEs in a list of MU-MIMO candidates comprising the UE; limiting a number of streams in any downlink MU-MIMO transmission from the network element; and prioritizing the UE over other UEs in a list of MU-MIMO candidates comprising the UE.

For example, if the gNB/eNB has detected a considerable, but not serious, channel error (i.e. greater than the first predetermined threshold but less than the second predetermined threshold), the UE may benefit from MU-MIMO if the gNB/eNB performs some special processing thereon.

In such a case, the gNB/eNB may keep this UE in the MU-MIMO candidate list. However, in comparison with the UE(s) for which no error is detected, the gNB/eNB may assign some dedicated resources to the UE to improve its channel status. For example, an orthogonal DMRS port may be assigned to the UE, which will improve the channel estimation accuracy on the UE side. This will help UE receiver side to be aware of interferences from other UEs operated in the MU-MIMO mode and accordingly eliminate at least a part of MU-MIMO interference.

Taking LTE as an example, if a UE is configured with TM8 (Transmission Mode 8), based on the current 3GPP Technical Specification, there are only 4 orthogonal DMRS ports supported for one TTI (Transmission Time Interval). If 7 UEs are scheduled to conduct downlink transmissions, and a medium level of channel error is detected only for UE #1, then a DMRS assignment may be given as follows:

DMRS port 1: UE #1
DMRS port 2: UE #2, UE #3
DMRS port 3: UE #4, UE #5
DMRS port 4: UE #6, UE #7

With the DMRS port 1 dedicated to UE #1, which is orthogonal to all other DMRS ports, UE #1 may have its channel estimator remove the interference on DMRS even if UE #1 suffers from the interference from UE #2 through UE #7. In other words, this dedicated DMRS resource may make UE #1 be aware of interference and make UE #1's receiver remove interference partially at least.

For another example, medium errors are detected for UE #1, UE #2, and UE #3, and therefore the DMRS assignment may be given as follows:

DMRS port 1: UE #1
DMRS port 2: UE #2
DMRS port 3: UE #3
DMRS port 4: UE #4, UE #5, UE #6, UE #7

Similarly, the dedicated DMRS resources may make UE #1, UE #2, and UE #3 be aware of interference and make their receivers remove interference partially at least.

Further, as mentioned above, the channel status for a UE may be improved by limiting the number of co-scheduled MU-MIMO UEs or number of layers or streams to mitigate the interference level for the UE.

For example, by assuming that 3 UEs are operated in the MU-MIMO mode and that the eNB/gNB may have some error in estimating the channel status for UE #1, UE #1 may suffer from interferences from UE #2 and UE #3: the interference power expectation from UE #2 is $\|\Delta H^* W_2\|^2$, and the interference power expectation from UE #3 is $\|\Delta H^* W_3\|^2$ according to the above equations.

In such a case, if the number of UEs which are operated in the MU-MIMO mode is reduced to 2 (e.g. UE #3 will not be scheduled as an MU-MIMO UE), then the total interference can be reduced to a tolerable range. This is very important especially when UE #1 has relative high priority in scheduling. For example, when UE #1's data are in re-transmission, in order to avoid a high latency introduced by too many rounds of re-transmission, UE #1 will be co-scheduled only with one other UE, rather than two other UEs.

Further, as also mentioned above, the channel status for a UE may be improved by prioritizing the UE over other UEs in a list of MU-MIMO candidates comprising the UE. For example, when UEs operating in the MU-MIMO mode are to be paired, the UE of which the channel status should be improved may be prioritized over other UEs in a list of MU-MIMO, thereby improving its channel status.

Referring back to FIG. 4, when the eNB/gNB determines that the temporal coherence is less than or equal to the second threshold at the step S420, the eNB/gNB may proceed to the step S425 to improve the channel status for the UE. However, in some other embodiments, the eNB/gNB may alternatively determine to deprioritize the UE with respect to other UEs in the list of MU-MIMO candidates comprising the UE since this UE cannot efficiently utilize MU-MIMO scheme in view of other UEs. No matter which step is chosen, it is up to a network operator to decide whether a UE with medium level of channel status error should be prioritized or de-prioritized in scheduling since either way is a reasonable choice. A possible situation could be: a UE with high value (for example, a premium user) is prioritized while a UE with less value (for example, a visiting user) is deprioritized.

Referring back to FIG. 4, when it is determined at the step S420 that the temporal coherence is greater than the second predetermined threshold, which indicates that the temporal coherence is high or the channel estimation error level is low, then at the step S430, the UE may be scheduled as it was. In other words, the eNB/gNB may determine that the UE has a good channel status, and therefore no further action is needed, and therefore the method 300 may end here.

Therefore, by using the above method 300, an accurate indicator of channel status error level, i.e. "time domain coherence" or "temporal coherence", can be obtained and the MU-MIMO system may select different processing methods based thereon, thereby achieving a flexible and highly efficient UE scheduling.

Figure 5:
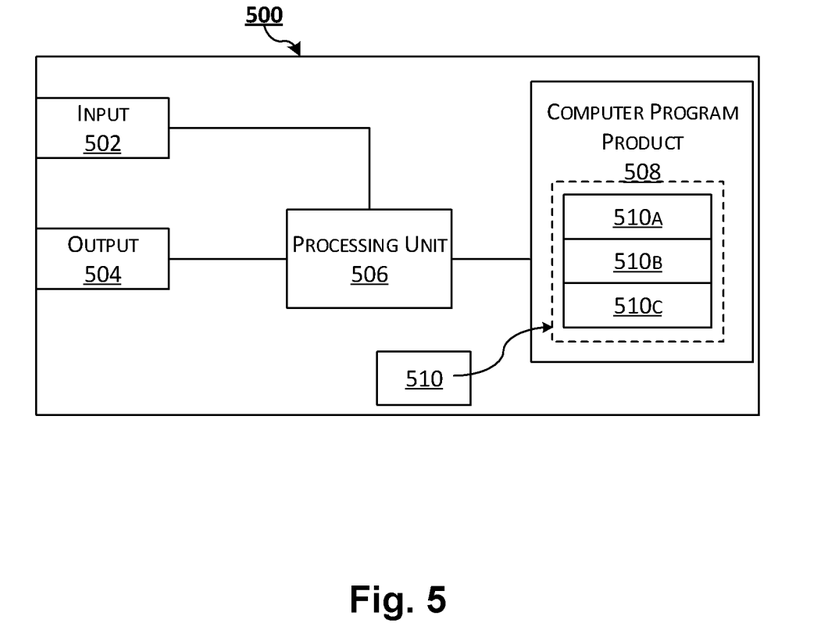
FIG. 5 schematically shows an embodiment of an arrangement which may be used in a network element according to an embodiment of the present disclosure.

FIG. 5 schematically shows an embodiment of an arrangement 500 which may be used in a network element according to an embodiment of the present disclosure.

Comprised in the arrangement 500 are a processing unit 506, e.g., with a Digital Signal Processor (DSP) or a Central Processing Unit (CPU). The processing unit 506 may be a single unit or a plurality of units to perform different actions of procedures described herein. The arrangement 500 may also comprise an input unit 502 for receiving signals from other entities, and an output unit 504 for providing signal(s) to other entities. The input unit 502 and the output unit 504 may be arranged as an integrated entity or as separate entities.

Furthermore, the arrangement 500 may comprise at least one computer program product 508 in the form of a non-volatile or volatile memory, e.g., an Electrically Erasable Programmable Read-Only Memory (EEPROM), a flash memory and/or a hard drive. The computer program product 508 comprises a computer program 510, which comprises code/computer readable instructions, which when executed by the processing unit 506 in the arrangement 500 causes the arrangement 500 and/or the network element in which it is comprised to perform the actions, e.g., of the procedure described earlier in conjunction with FIGS. 3 and 4 or any other variant.

The computer program 510 may be configured as a computer program code structured in computer program modules 510A-510C. Hence, in an exemplifying embodiment when the arrangement 500 is used in the network element, the code in the computer program of the arrangement 500 includes: a first determination module 510A for determining, for the UE, a first downlink channel status at a first time point and a second downlink channel status at a second time point which is later than the first time point, respectively. The code in the computer program further includes a second determination module 510B for determining, for the UE, a temporal coherence between the first downlink channel status and the second downlink channel status. The code in the computer program further includes a scheduling module 510C for scheduling the UE based on the determined temporal coherence.

The computer program modules could essentially perform the actions of the flow illustrated in FIGS. 3 and 4, to emulate the network element. In other words, when the different computer program modules are executed in the processing unit 506, they may correspond to different modules in the network element or the UE.

Although the code means in the embodiments disclosed above in conjunction with FIG. 5 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method at a network element for scheduling a user equipment (UE) for transmission, the method comprising the network element:
determining, for the UE, a first downlink channel status at a first time point and a second downlink channel status at a second time point; the second time point being later than the first time point;
determining, for the UE, a temporal coherence between the first downlink channel status and the second downlink channel status; and
scheduling the UE based on the determined temporal coherence.

2. The method of claim 1, wherein the determining the first channel status and the second channel status comprises:
determining, for the UE, a first uplink channel status at the first time point based on one or more uplink reference signals, as the first downlink channel status; and
determining, for the UE, a second uplink channel status at the second time point based on one or more uplink reference signals, as the second downlink channel status.

3. The method of claim 1, wherein the UE has a single antenna for downlink transmission; and wherein the determining the temporal coherence between the first downlink channel status and the second downlink channel status comprises:
calculating the temporal coherence based on the equation:

$$\text{Coherence} = \text{abs}(H(t_1) * H^*(t_2))$$

where Coherence denotes the temporal coherence to be calculated, $H(t_1)$ denotes the downlink channel status vector for the UE at the first time point $t_1$, $H^*(t_2)$ denotes the conjugate transpose of the downlink channel status vector for the UE at the second time point $t_2$, and abs(x) denotes the absolute value of x.

4. The method of claim 1, wherein the UE has multiple antennas for downlink transmission; and wherein the determining the temporal coherence between the first downlink channel status and the second downlink channel status comprises:

calculating the temporal coherence based on the equation:

$$\text{Coherence} = L_2(H(t_1) * H^*(t_2))$$

where Coherence denotes the temporal coherence to be calculated, $H(t_1)$ denotes the downlink channel status matrix for the UE at the first time point $t_1$, $H^*(t_2)$ denotes the conjugate transpose of the downlink channel status matrix for the UE at the second time point $t_2$, and $L_2(x)$ denotes the L2 norm of x.

5. The method of claim 1, wherein the scheduling the UE comprises precluding the UE from Multi-User Multi-Input-Multi-Output (MU-MIMO) transmission when it is determined that the temporal coherence is less than or equal to a first predetermined threshold.

6. The method of claim 5, wherein the precluding the UE from MU-MIMO transmission comprises:
releasing resource previously assigned to the UE for MU-MIMO transmission; and
excluding the UE from a list of MU-MIMO candidates.

7. The method of claim 1, further comprising improving channel status for the UE when it is determined that the temporal coherence is greater than a first predetermined threshold and less than or equal to a second predetermined threshold.

8. The method of claim 7, wherein the improving channel status for the UE comprises:
assigning dedicated reference signal (RS) resource to the UE for Multi-User Multi-Input-Multi-Output (MU-MIMO) transmission;
limiting a number of UEs in a list of MU-MIMO candidates comprising the UE;
limiting a number of streams in any downlink MU-MIMO transmission from the network element; and/or
prioritizing the UE over other UEs in the list of MU-MIMO candidates comprising the UE.

9. The method of claim 8, wherein the assigning dedicated RS resource to the UE for MU-MIMO transmission comprises assigning, to the UE, a DeModulation Reference Signal (DMRS) port which is currently not shared by other UEs in the list of MU-MIMO candidates.

10. The method of claim 1, further comprising deprioritizing the UE with respect to other UEs in a list of Multi-User Multi-Input-Multi-Output (MU-MIMO) candidates comprising the UE when it is determined that the temporal coherence is greater than a first predetermined threshold and less than or equal to a second predetermined threshold.

11. The method of claim 1, wherein the second time point is later than the first time point by a time length within a range between 2 ms and 640 ms.

12. The method of claim 3, wherein $H(t_1)$ and $H^*(t_2)$ are normalized.

13. The method of claim 12:
further comprising improving channel status for the UE when it is determined that the temporal coherence is greater than a first predetermined threshold and less than or equal to a second predetermined threshold;
wherein $H(t_1)$ and $H^*(t_2)$ are normalized;
wherein the first predetermined threshold has a value within a range between 0.4 and 0.6.

14. The method of claim 13, wherein the second predetermined threshold has a value within a range between 0.8 and 0.95.

15. The method of claim 4, wherein $H(t_1)$ and $H^*(t_2)$ are normalized.

16. The method of claim 15:
further comprising improving channel status for the UE when it is determined that the temporal coherence is greater than a first predetermined threshold and less than or equal to a second predetermined threshold;
wherein $H(t_1)$ and $H^*(t_2)$ are normalized;
wherein the first predetermined threshold has a value within a range between 0.4 and 0.6.

17. The method of claim 16, wherein the second predetermined threshold has a value within a range between 0.8 and 0.95.

18. A network element, comprising:
processing circuitry;
memory containing instructions executable by the processing circuitry whereby the device is operative to schedule a user equipment (UE) for transmission by:
determining, for the UE, a first downlink channel status at a first time point and a second downlink channel status at a second time point; the second time point being later than the first time point;
determining, for the UE, a temporal coherence between the first downlink channel status and the second downlink channel status; and
scheduling the UE based on the determined temporal coherence.

19. A non-transitory computer readable recording medium storing a computer program product for controlling a network element for scheduling a user equipment (UE) for transmission, the computer program product comprising program instructions which, when run on processing circuitry of the network element, causes the network element to:
determine, for the UE, a first downlink channel status at a first time point and a second downlink channel status at a second time point; the second time point being later than the first time point;
determine, for the UE, a temporal coherence between the first downlink channel status and the second downlink channel status; and
schedule the UE based on the determined temporal coherence.

* * * * *